United States Patent
de Zeeuw et al.

(10) Patent No.: US 10,487,222 B2
(45) Date of Patent: Nov. 26, 2019

(54) CONDUCTIVE TRANSPARENT COATING FOR RIGID AND FLEXIBLE SUBSTRATES

(71) Applicant: Henkel AG & Co. KGaA, Duesseldorf (DE)

(72) Inventors: Ard de Zeeuw, Duesseldorf (DE); Nicole Auweiler, Dormagen (DE); Gunther Dreezen, Balen-Olmen (BE); Inge van der Meulen, Veldhoven (NL)

(73) Assignee: Henkel AG & Co. KGaA, Duesseldorf (DE)

( * ) Notice: Subject to any disclaimer, the term of this patent is extended or adjusted under 35 U.S.C. 154(b) by 245 days.

(21) Appl. No.: 15/371,719

(22) Filed: Dec. 7, 2016

(65) Prior Publication Data

US 2017/0081527 A1 Mar. 23, 2017

Related U.S. Application Data

(63) Continuation of application No. PCT/EP2015/064257, filed on Jun. 24, 2015.

(30) Foreign Application Priority Data

Jun. 27, 2014 (EP) ..................................... 14174768

(51) Int. Cl.
C09D 5/24 (2006.01)
C09D 123/00 (2006.01)
C08K 7/06 (2006.01)
C09D 123/08 (2006.01)
B82Y 30/00 (2011.01)
C08K 3/04 (2006.01)
C08K 3/08 (2006.01)

(52) U.S. Cl.
CPC .................. C09D 5/24 (2013.01); C08K 7/06 (2013.01); C09D 123/0869 (2013.01); B82Y 30/00 (2013.01); C08K 3/04 (2013.01); C08K 3/046 (2017.05); C08K 2003/085 (2013.01); C08K 2003/0806 (2013.01); C08K 2201/001 (2013.01); C08K 2201/011 (2013.01)

(58) Field of Classification Search
CPC ........... C09D 5/24; C09D 123/00; C08K 7/06
USPC ........................................................ 524/381
See application file for complete search history.

(56) References Cited

U.S. PATENT DOCUMENTS

| | | | |
|---|---|---|---|
| 8,101,097 B2 | 1/2012 | Bahnmueller et al. | |
| 8,454,859 B2 | 6/2013 | Lowenthal et al. | |
| 2008/0283799 A1 | 11/2008 | Alden et al. | |
| 2008/0286447 A1 | 11/2008 | Alden et al. | |
| 2010/0101828 A1 | 4/2010 | Duarte et al. | |
| 2010/0243295 A1* | 9/2010 | Allemand ............... | B82Y 10/00 174/250 |
| 2011/0133134 A1 | 6/2011 | Varma et al. | |
| 2012/0097059 A1 | 4/2012 | Allemand et al. | |
| 2012/0217453 A1 | 8/2012 | Lowenthal et al. | |
| 2013/0266795 A1* | 10/2013 | Schultz .................... | C09D 5/24 428/323 |
| 2014/0255683 A1* | 9/2014 | Amici .................... | C09D 123/08 428/327 |
| 2016/0038973 A1 | 2/2016 | De Zeeuw et al. | |

FOREIGN PATENT DOCUMENTS

| | | |
|---|---|---|
| CN | 1163296 | 10/1997 |
| CN | 101250368 | 8/2008 |
| CN | 101379161 | 3/2009 |
| CN | 101580659 | 11/2009 |
| EP | 2119747 A1 | 11/2009 |
| WO | 03013199 A2 | 2/2003 |
| WO | 2007022226 A2 | 2/2007 |
| WO | 2007089114 | 8/2007 |
| WO | 2007089114 A1 | 8/2007 |
| WO | 2008054472 | 5/2008 |
| WO | 2008054473 A2 | 5/2008 |
| WO | 2008085550 A2 | 7/2008 |
| WO | 2009108306 A1 | 9/2009 |
| WO | 2011088323 A2 | 7/2011 |
| WO | 2012079677 A1 | 6/2012 |
| WO | 2013142440 A2 | 9/2013 |

* cited by examiner

Primary Examiner — Deve V Hall
(74) Attorney, Agent, or Firm — Steven C. Bauman

(57) ABSTRACT

The present invention relates to a conductive coating composition comprising a polyolefin copolymer resin comprising an olefin monomer and acrylic acid comonomer or (meth)acrylic acid comonomer, a plurality of anisotropic nanoparticles and a solvent.

13 Claims, No Drawings

CONDUCTIVE TRANSPARENT COATING FOR RIGID AND FLEXIBLE SUBSTRATES

TECHNICAL FIELD

The present invention relates to a transparent conductive coating based on an organic-based matrix and anisotropic metal nanoparticles. The coating has a good scratch resistance and is patternable via fine-line screen printing.

BACKGROUND OF THE INVENTION

Many conductive inks include a metal, such as silver, copper or aluminium, in a resin (binder) or resin (binding) medium. While such inks produce upon curing conductors which are substantially conductive and have a comparatively low electrical impedance (or resistance), the resulting conductors are substantially opaque and do not allow the transmission of any appreciable amount of light in the visual spectrum or other important spectra, such as ultraviolet and infrared spectra. However, optically transparent conductors are needed in a wide variety of applications.

Transparent conductors refer to thin conductive films coated on high-transmittance insulating surfaces or substrates. Transparent conductors may be manufactured to have surface conductivity while maintaining reasonable optical transparency. Such surface conducting transparent conductors are widely used as transparent electrodes for example in flat liquid crystal displays, touch panels, electroluminescent devices, and thin film photovoltaic cells, as anti-static layers and as electromagnetic wave shielding layers.

Typical printable transparent conductors, while having reasonable optical transparency, unfortunately often have a comparatively high electrical impedance and low conductivity when cured, with resistances typically in the range of 800-1000 or more ohms per square (e.g., polyethylenedioxithiophene). Vacuum deposited metal oxides, such as indium tin oxide (ITO), are commonly used industry standard materials to provide optical transparency and electrical conductivity to dielectric surfaces such as glass and polymeric films. However, metal oxide films are fragile and prone to damage during bending or other physical stresses. They also require elevated deposition temperatures and/or high annealing temperatures to achieve high conductivity levels. There also may be issues with the adhesion of metal oxide films to substrates that are prone to absorbing moisture such as plastic and organic substrates, e.g. polycarbonates. Applications of metal oxide films on flexible substrates are therefore severely limited. In addition, vacuum deposition is a costly process and requires specialized equipment. Moreover, the process of vacuum deposition is not conducive to form patterns and circuits, which typically leads in the need for expensive patterning processes such as photolithography.

A transparent conductive coating is needed for touch screens to operate the devices (tablets, smart phones etc.) via finger touch (for example resistive or projective capacitive). For the capacitive touch screens a high resolution pattern of the transparent conductive layer is required. The use of flexible plastic films instead of glass substrates enable a weight reduction and also enable the production of flexible touch screens, what opens a completely new area of applications.

Accordingly, there remains a need in the art to provide transparent conductors having desirable electrical, optical and mechanical properties, in particular, transparent conductors that are adaptable to rigid and flexible substrates and can be processed via simple processes.

SUMMARY OF THE INVENTION

The present invention relates to a conductive coating composition comprising a) a polyolefin copolymer resin comprising an olefin monomer and acrylic acid comonomer or (meth)acrylic acid comonomer; b) a plurality of anisotropic nanoparticles; and c) at least one solvent.

In addition, the present invention relates to a cured reaction product of the conductive coating composition.

The present invention also encompasses a coated substrate comprising a layer of conductive coating composition according to the present invention, wherein said layer is cured thermally or dried.

Furthermore, the present invention encompasses use of conductive coating composition according to the present invention in transparent electrode or conductor applications. More specifically, the present invention encompasses use of conductive coating composition according to the present invention as an ITO replacement in transparent electrode or conductor applications or as an electroluminescent lighting or as a transparent electrode in flexible or rigid touch panels or OLED displays or smart windows or transparent heaters or thin film photovoltaics or dye sensitized photovoltaics or organic photovoltaics or electromagnetic interference shielding or electrostatic discharge or membrane switches.

DETAILED DESCRIPTION OF THE INVENTION

In the following passages the present invention is described in more detail. Each aspect so described may be combined with any other aspect or aspects unless clearly indicated to the contrary. In particular, any feature indicated as being preferred or advantageous may be combined with any other feature or features indicated as being preferred or advantageous.

In the context of the present invention, the terms used are to be construed in accordance with the following definitions, unless a context dictates otherwise.

As used herein, the singular forms "a", "an" and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps.

The recitation of numerical end points includes all numbers and fractions subsumed within the respective ranges, as well as the recited end points.

All references cited in the present specification are hereby incorporated by reference in their entirety.

Unless otherwise defined, all terms used in the disclosing the invention, including technical and scientific terms, have the meaning as commonly understood by one of the ordinary skill in the art to which this invention belongs to. By means of further guidance, term definitions are included to better appreciate the teaching of the present invention.

The present invention provides a conductive coating composition comprising a polyolefin copolymer resin comprising an olefin monomer and acrylic acid comonomer or (meth)acrylic acid comonomer; a plurality of anisotropic nanoparticles; and at least one solvent. The viscosity and thixotropy of the conductive coating composition are optimized in order that high-resolution patterns can be printed using a simple screen printing process.

The conductive coating composition according to the present invention provides good conductive values and good mechanical properties, it has good adhesion to polyethylene terephthalate (PET), it provides good moisture barrier properties and it has good UV resistance (no discoloration).

Each of the essential components of the conductive coating composition according to the present invention are described in details below.

Polyolefin Copolymer Resin

A conductive coating composition according to present invention comprises a polyolefin copolymer resin comprising an olefin monomer and acrylic acid comonomer or (meth)acrylic acid comonomer. The use of polyolefin copolymer resin in the coating composition as an organic backbone results in a clear and water resistant coating on a substrate.

Polyolefin copolymer resin according to the present invention is prepared by conventional means known by the skilled person. Suitable polyolefin copolymer resins to be used in the present invention can be made by neutralization the carboxylic groups in a defined ratio. The process parameters can be used to steer the particle size and solid content of the dispersion. The dispersion can be conducted in an autoclave but also by extrusion.

Suitable olefin monomer to be used in the present invention is selected from the group consisting of ethylene, propylene, 1-butylene, amide, ethylenevinyl acetate and mixtures thereof. Preferably, olefin monomer is ethylene.

Suitable comonomer is selected from the group consisting of acrylic acid comonomer and (meth)acrylic acid comonomer.

Molecular weight of the polyolefin copolymer is preferably from 10 to 2500 Daltons, more preferably from 18 to 1800 Daltons. Molecular weight is measured by using Gel permeation chromatography (GPC) for determination of the relative molecular weight averages of the polymers soluble in tetrahydrofuran. Test apparatus is Separation module by Waters 2695 (AKZ no. 643 22 A 026) and Refractive index detector by Waters 2410 (AKZ no. 643 22 A 015) and Column oven (AKZ no.: 643 24 A 334) and Chromatographic data system Empower 3.

Suitable commercially available polyolefin copolymer resins to be used in the present invention are for example MP4990R and MP5931 from Michelmann.

Suitable polyolefin copolymer resin for the use in the present invention has a comonomer content from 2.5% to 40%, preferably from 5% to 40%, preferably from 10% to 25%. Ideal comonomer content enables dispersion or solution formation with the polyolefin copolymer resin.

A polyolefin copolymer resin can be added into the composition as a dispersion or as a solution. When the polyolefin copolymer resin is added as a dispersion, the particle size of the polyolefin copolymer resin particles in the dispersion is preferably from 50 nm to 550 nm.

A conductive coating composition according to the present invention comprises a polyolefin copolymer resin from 1 to 15% by weight of the total weight of the conductive coating composition, preferably from 1.5 to 12%.

Higher quantity of the resin (more than 15%), leads too high thickness and viscosity of the composition. Too high resin quantity also would disturb the anisotropic nanoparticles to resin ratio, and therefore, negatively effect on electrical and optical properties of the composition.

Anisotropic Nanoparticles

A conductive coating composition according to present invention comprises plurality of anisotropic nanoparticles.

Particles with high anisotropy are preferred. Anisotropic nanoparticles suitable for use in the present invention have an aspect ratio greater than 150, preferably greater than 200 and more preferably greater than 500.

Greater the aspect ratio of the anisotropic nanoparticles is, lower quantity of the anisotropic nanoparticles is needed (by weight) to obtain a network in the dried film. Lower quantity of the anisotropic nanoparticles in the composition is beneficial in order to provide good optical properties. Furthermore, low quantity of anisotropic particles also reduces the cost of the composition.

Suitable anisotropic particles to be used in the present invention are electron conductive particles. Preferably, the plurality of anisotropic nanoparticles are selected from the group consisting of silver containing particles, silver particles, copper particles, copper containing particles, silver nanowires, copper nanowires, carbon particles, carbon nanowires and mixtures thereof. Preferably, anisotropic particles are selected from silver containing particles, silver particles, silver nanowires and mixtures thereof.

Suitable commercially available anisotropic nanoparticles to be used in the present invention are for example AW030 from Kechuang and AgNW60 from Seashell.

A conductive coating composition according to the present invention comprises plurality of anisotropic nanoparticles from 0.15 to 1.25% by weight of the total weight of the conductive coating composition, preferably from 0.3 to 1.0%, more preferably from 0.4 to 0.8% and most preferably from 0.45 to 0.6%.

Too high concentration of anisotropic nanoparticles in the composition will lead to a decrease of the optical properties. On the other hand, too low concentration of anisotropic particles prevents the formation of the continuous network of anisotropic nanoparticles in the material and the electrical performance decreases significantly.

Electrical and optical properties of the conductive composition can be modified by changing the ratio between the anisotropic nanoparticles and the polyolefin copolymer resin. In order to have very good conductive material, more anisotropic nanoparticles per unit of polyolefin copolymer resin is required. However, to gain optimal optical properties, this ratio should be lower, since the nanoparticles have a negative influence on the optical performance of the conductive composition.

Preferably, the ratio between the anisotropic nanoparticles and the polyolefin copolymer resin (P/B) is about 0.3. By this ratio, it is meant that how many grams of anisotropic nanoparticles is per grams of the polyolefin copolymer resin. Although, this ratio varies depending on the aspect ratio of the anisotropic nanoparticle.

Solvent

A conductive coating composition according to present invention comprises at least one solvent. A wide variety of known organic solvents can be used in the present invention. As the solvent to be used in the present invention, it is not specifically limited as long as it has property to form a solution or a dispersion with polyolefin copolymer resin. Solvent is used to form a solution or a dispersion with polyolefin copolymer resin prior mixing it with the remaining ingredients.

Suitable solvent to be used in the present invention is selected from the group consisting of water, butyl diglycol, 2-butoxyethanol, diethylene glycol, ethanol, isopropanol, ethylene glycol, propylene glycol, dipropylene glycol and mixtures thereof.

In one embodiment, where water is used as a solvent to form a dispersion of polyolefin copolymer resin, a co-solvent is required in the final composition. Suitable co-solvent is any solvent that is miscible with water and anisotriopic nanoparticles. Preferably, co-solvent is selected from the group consisting of butyl diglycol, 2-butoxyethanol, diethylene glycol, ethanol, isopropanol, ethylene glycol, propylene glycol, dipropylene glycol and mixtures thereof.

Use of a co-solvent with water is required to provide good (screen) printing performance.

Suitable commercially available solvents to be used in the present invention are for example ethylene glycol and propylene glycol, both from Sigma Aldrich.

A conductive coating composition according to the present invention comprises a solvent from 45% to 99% by weight of the total weight of the conductive coating composition, preferably from 80% to 98%. The solvent quantity is meant to cover total sum of the solvent and the co-solvent.

Optional Ingredients

In addition to above mentioned ingredients a conductive coating composition according to the present invention may further comprise additional ingredients selected from the group consisting of a cross-linker, a rheology additive, an anti-foaming agent, curing agent, colouring agents, pigments and mixtures thereof.

A Cross-Linker

Highly preferred optional ingredient used in the present invention is a cross-linker. Suitable cross-linker to be used in the present invention is molecule that can react two times with a pendant acid group (from the polyolefin copolymer resin) within 10 min at 120° C.

Specific examples of suitable cross-linkers are for example EDC (also called EDAC) (1-ethyl-3-(-3-dimethyl-aminopropyl) carbodiimide hydrochloride), DCC (N',N'-dicyclohexyl carbodiimide), DIC (diisopropylcarbodiimide) or other carbodiimides and mixtures thereof.

Suitable commercially available cross-linkers to be used in the present invention are for example Tayzor TE Zr-Triethanolamine type of cross linking agents, EDC (also called EDAC) (1-ethyl-3-(-3-dimethylaminopropyl) carbodiimide hydrochloride), DCC (N',N'-dicyclohexyl carbodiimide), DIC (diisopropylcarbodiimide) all from Sigma-Aldrich.

Cross-linker enhances the mechanical properties of the cured coating, the scratch resistance and also the barrier properties of the material are improved even further.

A conductive coating composition according to the present invention comprises a cross linker from 0% to 0.5% by weight of the conductive coating composition, preferably from 0.01% to 0.25%, more preferably from 0.19% to 0.21%.

If too much crosslinker is added into the composition, the optical properties of the material will be negatively influenced. On the other hand, if not enough of cross-linker is added or not at all, the material may not be completely crosslinked, and this may negatively influence the mechanical properties and moisture barrier properties.

A conductive coating composition according to the present invention has a solid content from 0.15 to 10% by weight of the composition, preferably from 1 to 7%, more preferably from 1.75 to 5.25% and most preferably from 2 to 5%. Lower solid content is preferred because it enables to achieve minimum coating thicknesses, however, certain solid content is required in order to build network of anisotropic nanoparticles.

Preferably, the conductive coating composition according to the present invention is transparent.

In one embodiment, the conductive coating composition according to the present invention is transparent and can be screen printed. When conductive coating composition is screen printed, formed coating has less than 50% decrease in optical and electrical performance after 500 hours exposed to 85% RH/85° C. weathering test. 85% RH/85° C. weathering test is described in detail in the example section below.

In one embodiment, the conductive coating composition according to the present invention is transparent and can be screen printed. When conductive coating composition is screen printed, formed coating has less than 50% decrease in optical and electrical performance after 500 hours exposed to UVA according to ASTM 4587 test method.

In one embodiment, the conductive coating composition according to the present invention is transparent and can be screen printed. When conductive coating composition is screen printed, formed coating shows less than 25% decrease in optical and electrical performance after a double crease test. A double crease test is described in detail in the example section below.

A conductive coating composition according to the present invention has preferably a viscosity from 2 to 10 Pas measured according to a Rheometer measurement, plate/plate (2 cm), 200 micron gap, 15/s at 25° C., preferably from 3 to 5 Pas. Desired viscosity range of 2 to 10 Pas is ideal for the fine line printing performance.

A conductive coating composition according to the present invention has preferably a thixotropy from 3 to 6, preferably from 4 to 5. Thixotropy is viscosity measured at 1.5/s shear rate divided by viscosity measured at 15/s shear rate.

The conductive coating composition according to the present invention can be prepared in several ways of mixing all ingredients together.

In one embodiment the preparation of the conductive coating composition according to the present invention comprises following steps:

1) forming a dispersion or a solution from the polyolefin copolymer resin and a solvent;

2) mixing dispersion or a solution of step 1 with all optional ingredients together by using Hauschild speedmixer;

3) adding into the dispersion plurality of anisotropic nanoparticles and mixing by using Hauschild speedmixer for 1 min at 1800 rpm.

The coating composition according to the present invention can be cured or dried. Standard curing or drying profile is 10 minutes at 120° C. UV radiation can also be used in the curing process, however, different curing agent is required. Suitable curing agents for use in the present invention are for example peroxides such as dicumylperoxide from Sigma Aldrich. Drying at 120° C. provides a complete dried film with good moisture resistance.

The cured coating has as high transparency as possible, preferably the transparency is from 70% to 80% measured according to ASTM E1348-11, preferably from 72% to 77%.

The cured coating has as low haze as possible, preferably the haze is from 20 to 28 measured according to ASTM D1003-11, preferably from 22 to 26.

A conductive coating composition according to the present invention can be applied onto a substrate by various techniques. Suitable techniques for use here in are for example screen printing and roll printing. Preferably, a conductive coating composition according to the present invention is screen printed with a resolution 100 micron and a line width of 40 micron onto a substrate. The conductive coating according to the present invention enables high resolution screen printing of the desired pattern in one step, making the process simpler and faster.

Suitable substrates are any rigid or flexible transparent material. Preferably, the substrate is selected from the group consisting of glass, PET, PMMA, PC, glass with an organic or inorganic surface treatment, PET with inorganic or organic surface treatment, PMMA with inorganic or organic surface treatment, PC with inorganic or organic surface treatment and mixtures thereof. The organic or inorganic surface treatment for the substrate is to adjust adhesion, surface tension, refractive index or gas or liquid barrier properties.

In the production of a traditional touch panel for example, the deposition and drying of the transparent conductor is followed by printing an optically clear overcoat to protect the transparent conductor layer. The conductive coating layer according to the present invention does not require optically clear overcoat.

A conductive coating composition according present invention is suitable for use in transparent electrode or conductor applications.

A conductive coating composition according present invention is suitable for use as an ITO replacement in transparent electrode or conductor applications or as an electroluminescent lighting or as a transparent electrode in flexible or rigid touch panels or OLED displays or smart windows or transparent heaters or thin film photovoltaics or dye sensitized photovoltaics or organic photovoltaics or electromagnetic interference shielding or electrostatic discharge or membrane switches.

EXAMPLES

TABLE 1 example formulations

|  | Example 1 | Example 2 | Example 3 | Example 4 |
|---|---|---|---|---|
| EAA copolymer resin MichemPrime 4490R | 9 |  | 9 | 15 |
| EAA copolymer resin Michem Prime 5931 |  | 8 |  |  |
| anisotropic nanoparticles AW030 | 89.8 |  | 90.2 |  |
| anisotropic nanoparticles AgNW60 |  | 86 |  |  |
| Carbodilite E02 | 0.4 |  |  |  |
| Tyzor TE (Dorfketal) |  |  |  |  |
| Anionic thickener Acrysol ASE 60 |  | 5.2 |  |  |
| N-dimethylethanolannine | 0.8 | 0.8 | 0.8 | 0.8 |
| Silver containing nanowire NGAP 3103 |  |  |  | 30 |
| Solvent Propylene glycol |  |  |  | 54.2 |

MichemPrime 5931 and MichemPrime 4490R from Michelmann; AW030 from Kechuan; AgNW60 from Seashell; NGAP 3103 from Nanogap; Carbodilite E02 from Nisshinbo; Acrysol ASE 60 from DOW; N-dimethylethanolamine from Sigma Aldrich; Propylene glycol from Sigma Aldrich;

TABLE 2 example formulations

|  | Example 5 | Example 6 | Example 7 |
|---|---|---|---|
| EAA copolymer resin | 10.40 | 10.44 | 92.88 |
| Cross linker | 0.25 |  |  |
| Anisotropic nanoparticle in H$_2$O | 26.60 | 26.56 | 6.76 |
| Anionic thickener | 6.55 | 6.80 |  |
| N-dimethylethanolamine | 0.8 | 0.8 | 0.36 |
| Glycol based solvent | 55.40 | 55.40 |  |

Example 7 has resin in a diluted form, and hence, solvent is included into resin quantity. The resin content is 1.8 wt %.

EAA copolymer resin from Henkel; Anisotropic nanoparticle in H20 from Nanogap; N-dimethylethanolamine from Acros; cross linker from Nisshinbo; Anionic thickener from DOW; Glycol based solvent from Acros

TABLE 3 properties of the example formulations

|  | Example 5 | Example 6 |
|---|---|---|
| Viscosity 1.5/s | 22370 | 28460 |
| Viscosity 15/s | 2663 | 3018 |
| TI | 8.4 | 9.4 |
| pH | 8.7 | 8.7 |
| Sheet resistance | 55.0 | 45.0 |
| Haze (ASTM D1003-11) | 25.0 | 23.5 |
| Transparency at 550 nm (ASTM E1348-11) | 76.26 | 72.88 |
| UVA weathering test (ASTM D4587) | 5 | 5 |
| 85% RH/85° C. | 5 | 5 |
| Double crease test (test method described below in example 5) | 5 | 5 |
| Mandrell test (test method described below in example 5) | 0 | 0 |
| Color (ASTM D2244) L* a* b* | 90.62 −0.54 6.47 | 89.9 −0.63 7.14 |

A 85% RH/85° C. weathering test was conducted. 85% RH/85° C. weathering test method is as follows: The screen printed samples are placed in a weathering chamber (Weiss) at 85° C. and 85% relative humidity. The samples are arranged so that the active print is not in contact with other sheets. After a set period of time (in this case 500 h), the prints are taken out of the chamber and dried for at least 24 hours before measuring the properties.

The results summarized in Table 3 above show that due to the high thixotropy index of the material, these formulations are suitable for fine line and high resolution screen printing. The current state of the art transparent conductive inks have typically a thixotropy index around 1, which means that the material will flow after printing what results in line broadening. The sheet resistance is typical for these materials and can be optimized by optimization of the printing process. The optical properties are initially lower than the current state of the art, however, these values are stable during various weathering conditions, for example humidity testing and UVA aging. This means that these materials give a stable performance over time, where other currently used materials are not (see also Table 4 and 5).

Physical property testing of these materials reveals that the materials are bendable and even foldable, where with current state of the art materials loss of electrical function is observed (see also Table 4 and 5).

Example 4: Optical and Electrical Properties of Transparent Conductive Inks

The conductive coating composition according to the example 6 were prepared. The resin, nanowire, crosslink agent and the co-solvent were mixed in the proper ratio using a Hauschild speedmixer for 1 min at 1800 rpm. Different P/B ratios were used to obtain different sheet resistance values.

All inks were screen printed onto a clear PET substrate, containing silver bus bars to ensure a good contact point for measurements, using an EKRA X4 semi-automatic screen printer. The snap off distance was set between 1-5 mm. A durometer 60 squeegee was used with a polyester screen with mesh sizes varying from 305-420. The water resistant emulsion layer is 20 µm under the knuckle. The printed test pattern contains 6 areas with different lengths and in different directions. The sheet resistance was measured on the different areas. The average is reported. After curing for 10 minutes at 120° C. in a boxoven, the sheet resistance was measured with a Keithley with a 2-point probe and the transparency at 550 nm was measured with a Shimadzu UV-vis spectrophotometer (substrate transparency: 88%). All results are in table 4.

TABLE 4

Physical properties of the examples.

| Example | P/B | Mesh size | Sheet resistance $\Omega/\square$ | Transparency % |
|---|---|---|---|---|
| 6 | 0.33 | 305 | 39 | 76 |
| 7 | 0.28 | 305 | 31 | 78 |
| 8 | 0.25 | 305 | 51 | 80 |
| 9 | 0.22 | 305 | 87 | 81 |
| 10 | 0.20 | 305 | 94 | 81 |
| 11 | 0.18 | 305 | 2000 | 82 |
| 10 | 0.20 | 355 | 94 | 81 |
| 10 | 0.20 | 380 | 5300 | 81 |
| Loctite ECI 5003 (reference material) | 0.34 | 305 | 93 | 83 |
| Loctite ECI 5003 (reference material) | 0.34 | 355 | 92 | 84 |

Examples 7-11 have the same formula as example 6, however, the ratio of anisotropic nanoparticle and resin (P/B) is varied.

Example 5: Mechanical Properties and High Resolution Printing of Transparent Conductive Inks The polyolefin copolymer resin, anisotropic nanoparticle, crosslinking agent, water and the co-solvent were mixed in the proper ratio using a Hauschild speedmixer for 1 min at 1800 rpm. Different P/B ratios were used to obtain different sheet resistance values. Base composition is according to example 6.

All inks were screen printed onto a clear PET substrate, containing silver bus bars to ensure a good contact point for measurements, using an EKRA X4 semi-automatic screen printer. The snap off distance was set between 2-5 mm. A durometer 60 squeegee was used with a polyester screen with mesh sizes varying from 305-420. The water resistant emulsion layer is 20 µm on the screen. The test pattern contained lines and areas with different width and resolution. The narrowest lines printed were 40 µm and the highest resolution was 100 µm.

A Mandrell bending test was conducted. The sample was printed on PET and cut in a rectangle with known width and length. The sheet resistance was measured initially. Afterwards the sample was bent 180° C. over a Mandrell roll with diameter 10 mm. The side of the sheet where the ink is deposited was on the outside of the bend. Then 10 roll movements were performed and the sheet resistance was measured. Test results are summarized in the table below.

A double crease test was performed. The initial sheet resistance was recorded. The printed sample was folded with the ink on the inside of the fold. A 2 kg weight was rolled over the crease. Afterwards the printed sample was unfolded and folded a second time, now with the ink on the outside of the crease. Again the 2 kg weight was rolled over the crease. The sheet resistance was measured after unfolding. All results are in table 5.

TABLE 5

| Test | Example 6 | Loctite ECI 5003 (comparative sample) | ITO (indium tin oxide) |
|---|---|---|---|
| Print resolution | 100 µm | 200 µm | — |
| Finest line printable | 40 µm | 100 µm | — |
| Mandrell bend test | No change in SR | No change in SR | 50% increase in SR |
| Double crease | 5% increase in SR | >100% increase in SR | >100% increase in SR |

Example 6: Weathering Tests of Transparent Conductive Coatings

All inks (examples 5-11) were screen printed onto a clear PET substrate, containing silver bus bars to ensure a good contact point for measurements, using an EKRA X4 semi-automatic screen printer. The snap off distance was set between 1-5 mm. A durometer 60 squeegee was used with a polyester screen with mesh sizes varying from 305-420. The water resistant emulsion layer is 20 µm on the screen. The printed test pattern contains 6 areas with different lengths and in different directions.

The sheets were submitted in a climate chamber with a relative humidity of 85% at 85° C. or into a QUV UVA-340 machine (intensity: 0.6 W/m$^2$, 50° C.). Tests were conducted for at least 500 hours. Samples showed <5% increase in sheet resistance and transparency over this period in both the UVA and the 85% RH/85° C. testing, where the reference material showed >100% increase.

Example 7: Synthesis Procedure of the Resin Dispersion

The dispersion process needs to be done in an alkaline environment, wherein the temperature and pressure steer the process. The use of alkaline such as amines enable a non-reversible film-formation, especially against water. Especially, the use of remaining alkaline should be avoided due the fact that even in traces, they decrease the water stability. Process-wise the particle size can be controlled with physical parameters as well as with the degree of neutralization.

What is claimed is:
1. A conductive coating composition comprising
   a) a polyolefin copolymer resin comprising an olefin monomer and acrylic acid comonomer or (meth)acrylic acid comonomer;

b) a plurality of anisotropic nanoparticles having an aspect ratio of greater than about 150; and c) at least one solvent, wherein the anisotropic nanoparticles and the polyolefin copolymer resins are present in a ratio of about 0.3.

2. A conductive coating composition according to claim 1, wherein said olefin monomer is selected from the group consisting of ethylene, propylene, 1-butylene, amide, ethylene vinyl acetate and mixtures thereof.

3. A conductive coating composition according to claim 1, wherein said polyolefin copolymer resin has a comonomer content from 2% to 40%.

4. A conductive coating composition according to claim 1, wherein said composition comprises a polyolefin copolymer resin from 1 to 15% by weight of the total weight of the conductive coating composition.

5. A conductive coating composition according to claim 1, wherein said plurality of anisotropic nanoparticles are selected from the group of silver containing particles, silver particles, copper particles, copper containing particles, silver nanowires, carbon particles, carbon nanowires and mixtures thereof.

6. A conductive coating composition according to claim 1, wherein said plurality of anisotropic nanoparticles has an aspect ratio greater than about 200.

7. A conductive coating composition according to claim 1, wherein said composition comprises plurality of anisotropic nanoparticles from 0.15 to 1.25% by weight of the total weight of the conductive coating composition.

8. A conductive coating composition according to claim 1, wherein said at least one solvent is selected from the group consisting of water, butyl diglycol, 2-butoxyethanol, diethylene glycol, ethanol, isopropanol, ethylene glycol, propylene glycol, dipropylene glycol and mixtures thereof.

9. A conductive coating composition according to claim 1, wherein said composition comprises a solvent from 45% to 99% by weight of the total weight of the conductive coating composition.

10. A conductive coating composition according to claim 1, wherein said composition has a solid content from 0.15 to 10% by weight of the composition.

11. A cured reaction product of the conductive coating composition according to claim 1.

12. A coated substrate comprising a layer of conductive coating composition according to claim 1, wherein said layer is cured thermally or dried.

13. A coated substrate according to claim 12, wherein said substrate is a rigid or a flexible transparent material.

* * * * *